United States Patent [19]

Carter et al.

[11] Patent Number: 4,662,083
[45] Date of Patent: May 5, 1987

[54] VENTILATING SYSTEM FOR DRYERS

[76] Inventors: John L. Carter, 4045 NW. Carlton Ct., Portland, Oreg. 97229; Michael M. Sprague, 11650 SW. Ann, Tigard, Oreg. 97223

[21] Appl. No.: 908,917

[22] Filed: Sep. 18, 1986

Related U.S. Application Data

[63] Continuation of Ser. No. 754,906, Jul. 15, 1985, abandoned.

[51] Int. Cl.[4] .............................................. F26B 21/08
[52] U.S. Cl. .......................................... 34/86; 34/191; 34/233
[58] Field of Search ................... 34/35, 86, 191, 225, 34/233; 165/104.14, 54

[56] References Cited

U.S. PATENT DOCUMENTS

| Re. 28,226 | 11/1974 | Cook | 34/191 |
|---|---|---|---|
| 1,268,180 | 6/1918 | Tiemann | 34/191 |
| 2,206,858 | 7/1940 | McKee | 165/54 |
| 2,938,714 | 5/1960 | Gerrish | 34/86 |
| 4,303,122 | 12/1981 | Powell | 165/104.14 |
| 4,326,344 | 4/1982 | Smith | 34/86 |

OTHER PUBLICATIONS

Forests Products Journal, vol. 31, No. 2, Energy Conservation in Wood Dryers Using Vent Air Energy Recovery Devices, Albert C. Kent, Howard N. Rosen and David A. Crotty, pp. 43-49.
Proceedings of the North American Wood Drying Symposium, Mississippi Forest Products Utilization Laboratory, Philip H. Mitchell, pp. 107-129.

*Primary Examiner*—Larry I. Schwartz
*Attorney, Agent, or Firm*—Eugene M. Eckelman

[57] ABSTRACT

First and second ported ducts are associated with a drying chamber. A flow control housing has first and second compartments communicating respectively with the first and second ducts. These compartments also have openings which communicate with atmosphere. A fan is employed which draws air from the drying chamber into one of the ducts and through one of the compartments to atmosphere. At the same time a fan on a common shaft draws in make-up air from the atmosphere and forces it through the other of the compartments and into the other duct for discharge into the dryer. The fans are reversible, and the flow control housing is combined with a double acting heat exchanger which extracts heat from exhaust air in one compartment and transfers it to the other compartment for preheating make-up air. A damper is provided in the flow control housing on the atmosphere side thereof for precise control of exhaust and make-up air.

8 Claims, 3 Drawing Figures

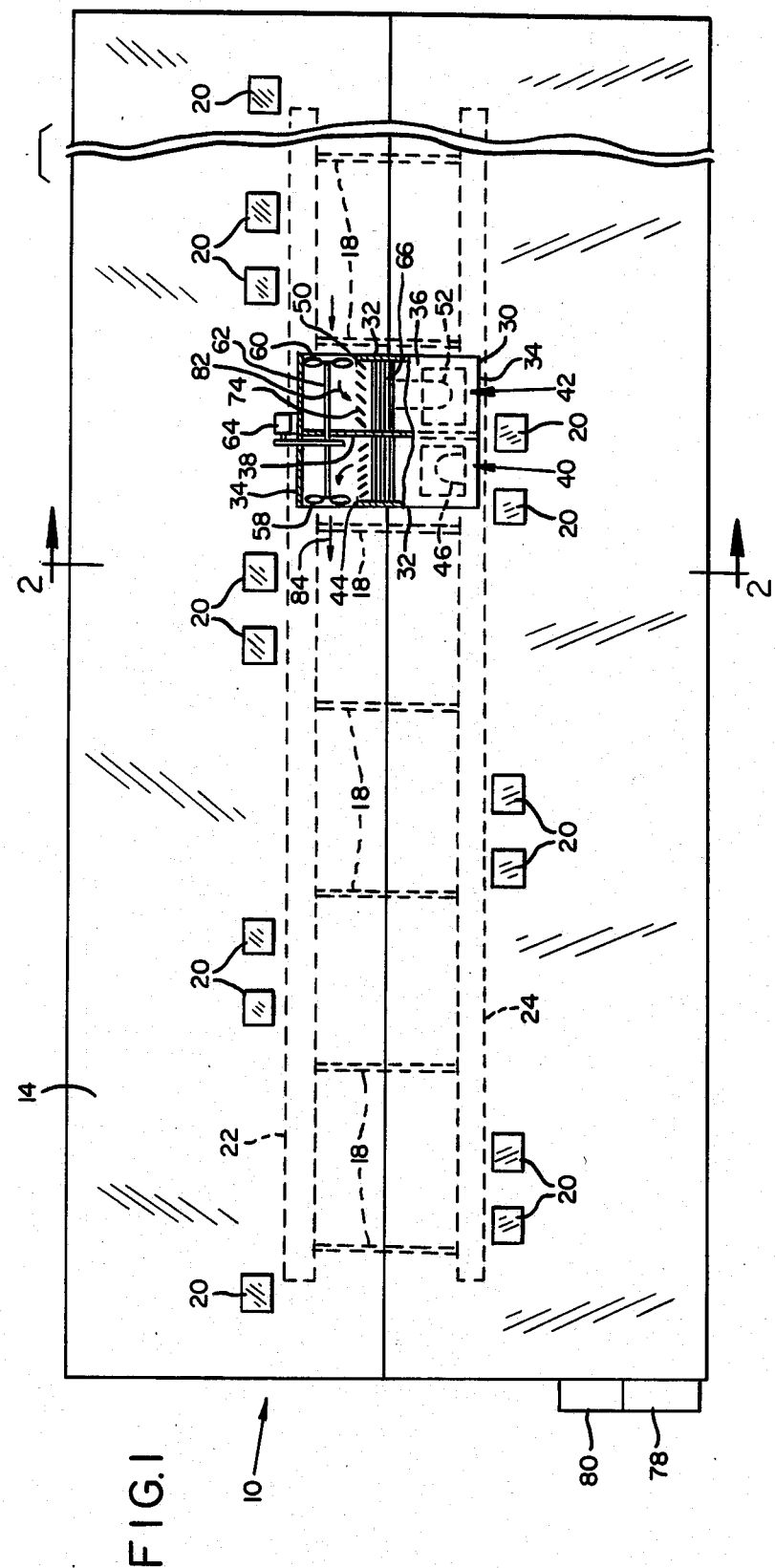
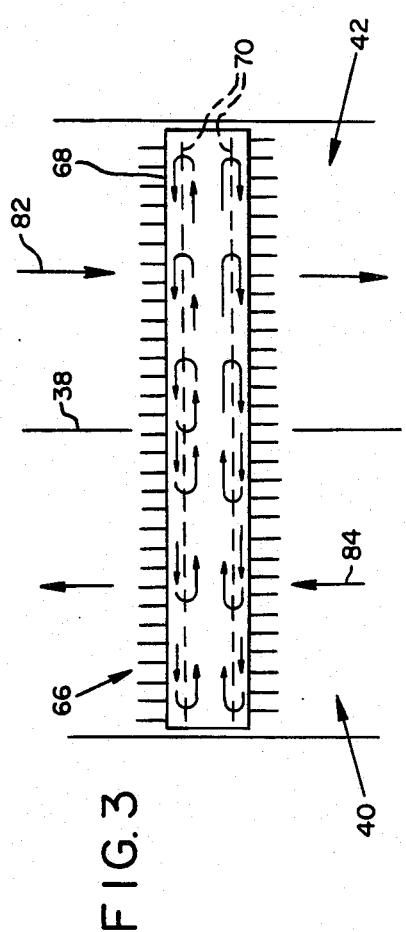
FIG.1
FIG.3

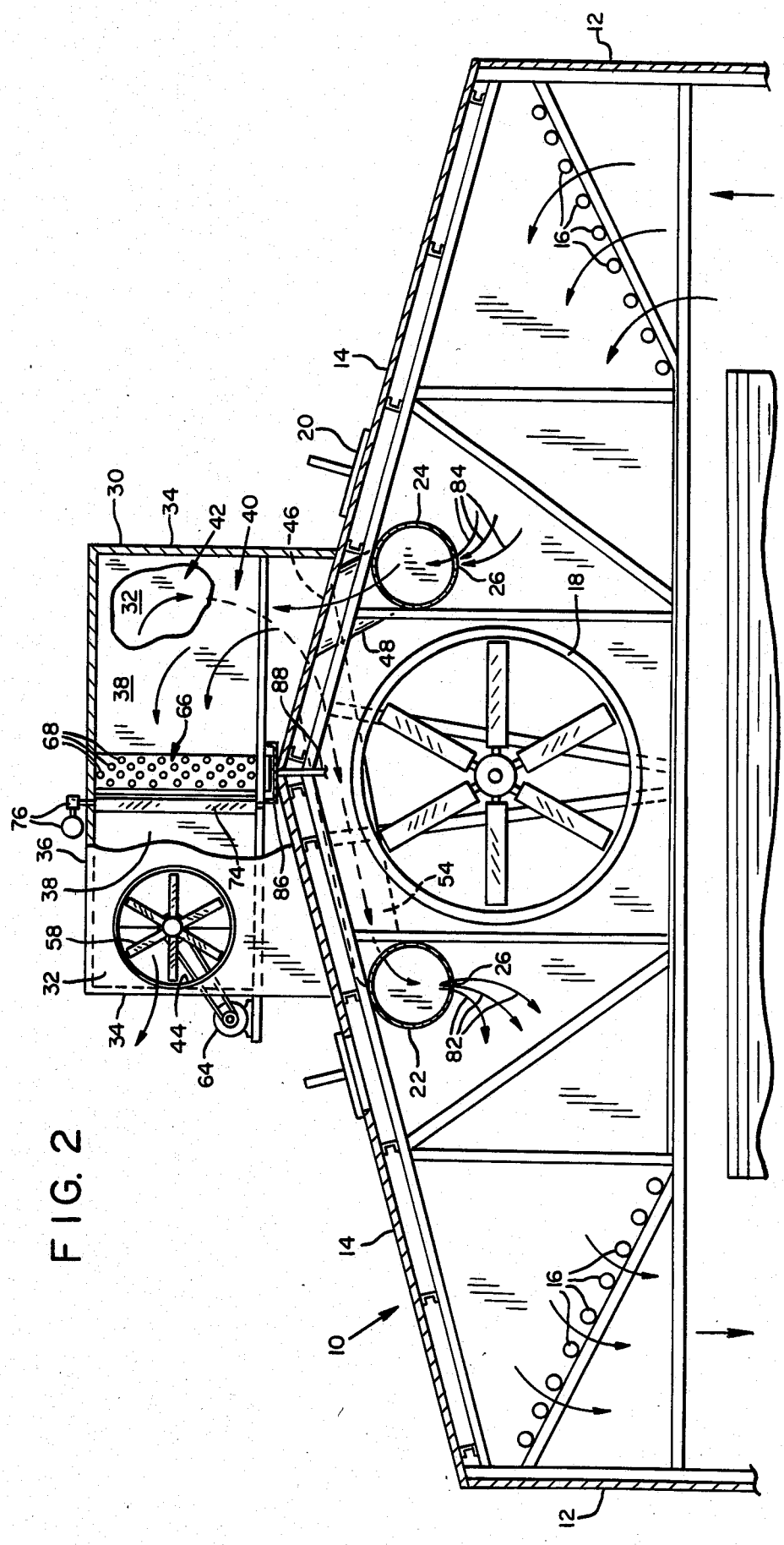

VENTILATING SYSTEM FOR DRYERS

This application is a continuation of application Ser. No. 754,906 filed July 15, 1985, now abandoned.

BACKGROUND OF THE INVENTION

This invention relates to new and useful improvements in ventilating systems for dryers of the type which utilize heat and circulating air means in combination. The invention in particular relates to a system capable of recovering waste heat from an exhaust air stream and transferring it to a make-up stream of air entering the dryer.

Various types of ventilating systems have been used in dryers which cure articles such as lumber kilns, fruit dryers, and the like. These ventilating systems comprise essentially means for heating the interior of the dryer, circulating means, outlet means for discharging moisture laden air, and means for drawing in make-up air. These prior systems have some inherent disadvantages. For example, the moisture laden heated air is discharged directly into atmosphere which comprises a waste of valuable energy. Also, the incoming air must be heated to accomplish the desired drying and pickup of moisture and this requires considerable energy for bringing the make-up air to its working temperature. These conditions lead to a more expensive operation in view of the energy required for heating. Also, the opening of roof vents in present day dryers decreases the pressure in the dryer and this in turn causes a velocity drop across the load as well as allowing inefficient escape of make-air.

SUMMARY OF THE INVENTION

According to the present invention and forming a primary objective thereof, a ventilating system is provided for dryers that efficiently extracts waste heat from an exhaust air stream and transfers it to a make-up stream.

More specific objectives of the invention are to provide a ventilating system that, except for some ducts, may be mounted exteriorly of the drying chamber, thus providing minimum interference with the interior of the drying chamber and easy adaptation to existing dryers; to provide a novel housing structure and fan arrangement for moving incoming or make-up air and outgoing air through the drying chamber; and to provide a novel arrangement utilizing a heat pipe of the type that efficiently extracts heat from the outgoing air and transfers it to the incoming air.

In carrying out these objectives, first and second ported ducts are utilized and arranged for mounting within a drying chamber. A flow control housing has first and second compartments communicating respectively with the first and second ducts. These compartments have openings which communicate with atmosphere. Fan means are employed which draw air from the drying chamber into one of the ducts and through one of the compartments to atmosphere. At the same time, fan means draw in make-up air from the atmosphere and force it through the other of the compartments and into the other duct for discharge into the dryer. The fans may be mounted on a common shaft and preferably produce substantially equal flow of exhaust and make-up air. The shaft may be driven by an electric motor which is reversible whereby to operate the fans in a selected direction coordinated with circulating fans in the dryer whereby to reverse air flow. The flow control housing has a novel structure for providing the air travel and in addition has a novel combination with a double acting heat exchanger which efficiently extracts heat from exhaust air in one compartment and transfers it to the other compartment for preheating make-up air. Damper means are provided in the flow control housing for precise control of exhaust and make-up air.

BRIEF DESCRIPTION OF THE DRAWINGS

FIG. 1 is a foreshortened top plan view of a ventilating system for dryers employing features of the present invention;

FIG. 2 is an enlarged cross sectional view taken on the line 2—2 of FIG. 1, a portion of this view being broken away; and FIG. 3 is a diagrammatic view of heat exchange means that may be utilized with the present invention.

DETAILED DESCRIPTION OF A PREFERRED EMBODIMENT

With particular reference to the drawings and first to FIGS. 1 and 2, the present ventilating system is illustrated in an exemplary form in combination with a building 10 having enclosing walls 12 and a roof 14. Heating elements 16 are located within the building, and large circulating fans 18 are suitably located in an upper portion of the building for moving the air through and around the product being dried. Moisture laden air is exhausted through controlled discharge vents 20. Make-up air is drawn in through other vents in the roof. Under normal procedures, the discharge and make-up air vents 20 are remotely controlled to provide the desired wet bulb - dry bulb ventilation. Also, drive and control means for the large fans 18 provide controlled operation thereof and generally these fans are right and left fans which are reversible to change the direction of air flow around the product, thus maintaining uniformity of drying of the product. The structure thus far described is conventional.

In accordance with the present invention, a ventilating system is arranged for combination with drying chambers of a type including structure set out above, although it is to be understood that the present system can be combined with substantially any type of drying chamber regardless of the existing circulating means.

According to the present invention, longitudinal ducts or conduits 22 and 24 are secured to the building, preferably lengthwise of the building and in spaced relation on opposite sides of the longitudinal center. Each of these ducts has a plurality of ports 26 strategically located throughout its length which allow inlet and outlet of air, as will be more apparent hereinafter. The longitudinal ducts preferably are mounted interiorly of the building but in some applications they may be mounted exteriorly thereof with the ports 26 communicating with the interior of the dryer.

An air flow control housing 30 is mounted on top of the building at about the longitudinal center, this housing having enclosing end walls 32, side walls 34 and a top wall 36. The housing furthermore has a transversely extending dividing wall 38 forming two full width compartments 40 and 42 in similar arrangement.

Compartment 40 has an inlet opening 44 in one end wall and at one side thereof, and this compartment also has a bottom outlet 46 on its other side communicating with the duct 24 by means 48. In a similar arrangement, the other end wall 32 has an inlet opening 50 on the same side as the inlet opening 44 and a bottom outlet opening 52 on the same side of the housing as the outlet opening 46. Outlet 52 communicates with the longitudinal conduit 22 by lateral duct means 54.

A fan 58 is disposed in the compartment 40 at the opening 44 and a fan 60 is disposed in the compartment 42 at the opening 50. These two fans are secured on a common shaft 62 journaled longitudinally in the housing 30 and driven by a reversible electric motor 64 capable of selectively driving the fans in one direction or the other.

Contained in the housing centrally across the compartments 40 and 42 is a double acting heat exchanger 66 capable of extracting heat from either of the compartments 40 or 42 and transferring it to the other compartment. One such heat exchanger, known in the trade as the Howden heat pipe, works extremely efficiently and is shown diagrammatically in FIG. 3. This type of heat exchanger is made up of one or more sealed and finned horizontal pipes 68, each having a capillary wick structure 70 therein, and a working fluid in the wick structure. Each pipe is sealed under a vacuum, and since a vacuum exists, the working fluid is in equilibrium with its own vapor. Heating one end of the external surface of the pipe causes the instantaneous evaporation of the working fluid near that surface. The rapid generation of vapor on the pipe wall creates a pressure which forces the excess vapor to the far end of the pipe. The vapor is then condensed and the latent heat of vaporization transferred. This type of heat exchange pipe is extremely applicable to the present system and also very desirous since there are no moving parts, no external fans, no connections to a fluid supply, no noise, and no external power required, and it functions in either direction. In a typical installation a considerable number of the pipes 68 are mounted horizontally across the compartments 40 and 42, the exact number of such pipes varying according to the calculated requirements of the system. Since these pipes do not have moving parts, connections, etc. they can be readily mounted in place by any suitable mounting means, not shown.

Also extending transversely on the inlet or atmospheric side of the heat exchanger 66, namely, between the heat pipe and the openings 44 and 50, is a louver-type damper 74 rotatable between open and closed positions, or intermediate positions, by a suitable air operated cylinder and linkage means 76. This damper has uniform control for the two chambers such that it allows identical flow of air in the two compartments, namely the flow of make-up air will always be equal to flow of exhaust air. Also, the cylinder and linkage means 76 for the damper 74 are controlled by suitable means 78 of well known structure in a control center of the dryer which may be manually or automatically operated. Also, as described, the motor 64 is reversible to reverse operation of the fans 58 and 60 and thus to reverse the direction of flow of make-up air and exhaust air through the compartments 40 and 42. In addition, the direction of rotation of motor 64 has common control with the reversibly operating main fans 18 by suitable controls 80. That is, the controls 78 and 80 are coordinated such that motor 64 will automatically reverse the fans 58 and 60 when fans 18 reverse.

With reference to the operation of the present ventilating system, in one direction of rotation of the fans 58 and 60, make-up or incoming air is drawn in through opening 50 of the flow control housing and forced through compartment 42, out the bottom outlet opening 52, into the lateral duct means 54 and into longitudinal duct 22 for distribution into the the drying chamber. This flow of air is illustrated by the arrows 82 in FIGS. 1-3. In this phase of operation, the negative pull from fan 58 draws moisture laden air into duct 24, through duct 48, through the chamber 40, and out end opening 44. This flow of air is illustrated by the arrows 84 in FIGS. 1-3. In the reverse operation of the fans 58 and 60, the direction of air movement shown by arrows 82 and 84 will reverse, namely, makeup air is drawn in through opening 44 and forced through compartment 40, out bottom outlet 46, through duct 48 and then distributed into the drying chamber by the duct 24. At the same time, negative pressure from fan 60 draws moisture laden air from conduit 22 into bottom outlet 52, by means of lateral duct 54, through the compartment 42 and out the opening 50.

In either direction of movement, the heat exchanger 66 extracts heat from the one compartment, namely, from the compartment which is exhausting to atmosphere, and transfers it over to the other compartment, namely, to the compartment through which make-up air is moving. Thus, considerable waste heat is recovered and re-used whereby to lower the over-all energy requirements.

As this heat extraction takes place, condensation will form. For this purpose a bottom pickup reservoir 86 is provided under the heat exchange device. The collected fluid is drained off through a conduit means 88 preferably leading through the dryer so as not to require insulation and discharging exteriorly of the building.

The present ventilating system is capable of providing the desired ventilation at the desired temperature and moisture condition, namely, it can readily be combined with the main circulating fans of a dryer to assist in the over-all drying function. The fans 58 and 60 overcome the internal pressures of the kiln so that vented air is extracted on the negative side and heated air is injected on the positive side of the kiln fans. This arrangement improves air velocity through the load during venting as opposed to the conventional kiln vent arrangement which loses fan volume during venting. Also, the damper means 74 can be regulated to assist in the drying operation. The dampers remain closed until venting is required. Then as venting is needed the fans start and the dampers control the amount of venting as directed by the control center.

The system has special design so as to be disposed exteriorly of the dryer. Thus, the invention can be readily installed in existing dryers. Also, the invention provides minimum interference with the interior of the efficiency of dryers. It can be readily combined with existing dryers or used in new systems. It is inexpensive to operate and maintain and relatively inexpensive to install.

It is to be understood that the form of our invention herein shown and described is to be taken as a preferred example of the same and that various changes in the shape, size and arrangement of parts may be resorted to without departing from the spirit of our invention, or the scope of the subjoined claims.

Having thus described our invention, we claim:

1. A ventilating system for controlling the wet bulb-dry bulb conditions of drying chambers having defining side, end, top and bottom walls, and arranged to receive a load through which air is to be circulated, said system comprising, first and second elongated conduits arranged for communicating with a drying chamber and having ports establishing communication between said conduits and the drying chamber, said first and second conduits being arranged for location in the drying chamber so as to be located longitudinally on opposite sides of a load in the drying chamber;

a flow control housing having first and second compartments communicating respectively with said first and second conduits, opening means in each of said first and second compartments communicating with atmosphere;

controllable fan means operable to draw exhaust air from the drying chamber through one of said first and second compartments and its associated conduit and force makeup air through the other of said first and second compartments and its associated conduit into the drying chamber;

heat exchange means in said flow control housing extracting heat from exhaust air being discharged in one of said compartments and transferring said heat to the other compartment for preheating makeup air being admitted;

and controllable damper means in said flow control housing between said heat exchange means and said opening means controlling the flow of exhaust and makeup air through said compartments.

2. The ventilating system of claim 1 wherein said flow control housing is arranged for mounting at the top and exteriorly of a drying chamber, and means adjacent one side of said flow control housing arranged to provide communication between said compartments and their respective ducts or conduits.

3. The ventilating system of claim 1 wherein said flow control housing is arranged for mounting at the top and exteriorly of a drying chamber, means adjacent one side of said flow control housing arranged to provide communication between said compartments and their respective ducts, said opening means being disposed at the other side of said flow control housing relation to sid one side, said fan means being supported in said flow control housing adjacent said other side thereof and adjacent said opening means.

4. The ventilating system of claim 1 wherein said heat exchange means includes a vacuum sealed pipe and a capillary wick and working fluid which in operation causes evaporation of said working fluid when heated at one end which in turn generates vapor at a pressure causing it to travel to the other end where it is condensed and the latent heat of vaporization transferred.

5. A dryer for controlling the wet bulb-dry bulb conditions of its interior comprising defining side, end, top and bottom walls forming a dryer chamber arranged to receive a load through which air is to be circulated;

reversible circulating fans in said drying chamber;

drive means for said circulating fans;

first and second duct means mounted in said drying chamber and having ports establishing communication between said ducts and said drying chamber, said first and second duct means being arranged for location in said drying chamber so as to be located on opposite sides of a load in said drying chamber;

a flow control housing having first and second compartments communicating respectively with said first and second duct means;

opening means in each of said first and second compartments communicating with atmosphere;

controllable fan means operable to draw exhaust air from the drying chamber through one of said first and second compartments and its associated duct means and force makeup air through the other of said first and second compartments and its associated duct means into said drying chamber;

drive means operably connected to said fan means for driving said fan means and providing flow of exhaust and makeup air through said compartments and duct means;

heat exchange means in said flow control housing extracting heat from exhaust air being discharged in one of said compartments and transferring said heat to the other compartment for preheating makeup air being admitted;

and controllable damper means in said flow control housing between said heat exchange means and said opening means controlling the flow of exhaust and makeup air through said compartments, said drive means for said fan means being reversible for reversing the flow of exhaust and makeup air through said first and second compartments and said first and second duct means, said drive means for said circulating fans being reversible and being synchronized with the drive means for said fan means for simultaneously reversing said fan means and said circulating fans.

6. The dryer of claim 5 wherein said flow control housing is mounted on the top exterior of said drying chamber and includes conduit means establishing communication between said ducts and their respective compartments.

7. A ventilating system for controlling the wet bulb-dry bulb conditions of drying chambers having defining side, end, top and bottom walls, and arranged to receive a load through which air is to be circulated, said system comprising, first and second elongated conduits arranged for communicating with a drying chamber and having ports establishing communication between said conduits and the drying chamber, said first and second conduits being arranged for location in the drying chamber so as to be located on opposite sides of a load in the drying chamber;

a flow control housing defined by side, end, top and bottom walls and including a transverse partition forming first and second parallel and independent compartments communicating respectively with said first and second conduits;

opening means in the end walls of each of said first and second compartments communicating with atmosphere;

controllable fan means operable to draw exhaust air from the drying chamber through one of said first and second compartments and its associated conduit and force makeup air through the other of said first and second compartments and its associated conduit into the drying chamber;

said fan means comprising a fan associated with each of said compartments, said fans being mounted on a common shaft passing through said partition wall in said housing and producing substantially equal flow of exhaust and mekaup air;

drive means operably connected to said shaft for driving said shaft and providing flow of exhaust and makeup air through said compartments and conduits at said equal rate;

heat exchange means in said flow control housing extending through said partition between said first and second compartments, said heat exchange means extracting heat from exhaust air being discharged in one of said compartments and transferring said heat to the other compartment for preheating makeup air being admitted;

and controllable damper means in said flow control housing between said heat exchange means and said opening means controlling the flow of exhaust and makeup air through said compartments.

8. A dryer for controlling the wet bulb-dry bulb conditions of its interior comprising, defining side, end, top and bottom walls forming a dryer chamber arranged to receive a load through which air is to be circulated;

reversible circulating fans in said drying chamber;

drive means for said circulating fans;

first and second duct means mounted in said drying chamber and having ports establishing communication between said ducts and said drying chamber, said first and second duct means being arranged for location in said drying chamber so as to be located on opposite sides of a load in said drying chamber;

a flow control housing having first and second compartments communicating respectively with said first and second duct means;

opening means in each of said first and second compartments communicating with atmosphere;

controllable fan means operable to draw exhaust air from the drying chamber through one of said first and second compartments and its associated duct means and force makeup air through the other of said first and second compartments and its associated duct means into said drying chamber;

drive means operably connected to said fan means for driving said fan means and providing flow of exhaust and makeup air through said compartments and duct means;

heat exchange means in said flow control housing extracting heat from exhaust air being discharged in one of said compartments and transferring said heat to the other compartment for preheating makeup air being admitted;

and controllable damper means in said flow control housing between said heat exchange means and said opening means controlling the flow of exhaust and makeup air through said compartments, reversing means for reversing the flow of exhaust and makeup air through said first and second duct means, said drive means for said circulating fans being reversible and being synchronized with said reversing means for simultaneously reversing said flow of exhaust and makeup air and the air from said circulating fans.

* * * * *